United States Patent
Otto

(10) Patent No.: US 12,246,449 B2
(45) Date of Patent: Mar. 11, 2025

(54) DEVICE AND METHOD FOR CONTROLLING A ROBOTIC DEVICE

(71) Applicant: Robert Bosch GmbH, Stuttgart (DE)

(72) Inventor: Fabian Otto, Tuebingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 536 days.

(21) Appl. No.: 17/447,553

(22) Filed: Sep. 13, 2021

(65) Prior Publication Data
US 2022/0080586 A1   Mar. 17, 2022

(30) Foreign Application Priority Data
Sep. 17, 2020 (DE) .......................... 102020211648.2

(51) Int. Cl.
*B25J 9/16* (2006.01)
*G05B 13/02* (2006.01)

(52) U.S. Cl.
CPC .............. *B25J 9/163* (2013.01); *B25J 9/161* (2013.01); *G05B 13/027* (2013.01); *G05B 2219/39001* (2013.01)

(58) Field of Classification Search
CPC ......... B25J 9/163; B25J 9/161; G05B 13/027; G05B 2219/39001; G05B 2219/40499
See application file for complete search history.

(56) References Cited

U.S. PATENT DOCUMENTS

| | | | |
|---|---|---|---|
| 5,319,738 A | 6/1994 | Shima et al. | |
| 8,019,713 B2 | 9/2011 | Gupta et al. | |
| 9,707,680 B1 | 7/2017 | Jules et al. | |
| 10,751,879 B2 | 8/2020 | Li et al. | |

(Continued)

FOREIGN PATENT DOCUMENTS

| | | |
|---|---|---|
| DE | 4440859 A1 | 5/1996 |
| DE | 112010000775 T5 | 3/2013 |

(Continued)

OTHER PUBLICATIONS

Yang, Tsung-Yen, et al. "Projection-Based Constrained Policy Optimization." International Conference on Learning Representations. Published 2019.*

(Continued)

*Primary Examiner* — Jason Holloway
*Assistant Examiner* — Blake A Wood
(74) *Attorney, Agent, or Firm* — NORTON ROSE FULBRIGHT US LLP; Gerard A. Messina

(57) ABSTRACT

A device and a method for controlling a robotic device are described. The method includes: carrying out a sequence of actions by the robotic device using a robot control model; ascertaining an updated policy using the carried-out sequence of actions; projecting the updated policy onto a projected policy in such a way that for each state of the plurality of states of the projected policy: a similarity value according to a similarity metric between the projected policy and the updated policy is maximized, and a similarity value according to the similarity metric between the projected policy and the initial policy is greater than a predefined threshold value; adapting the robot control model for implementing the projected policy; and controlling the robotic device, using the adapted robot control model.

15 Claims, 4 Drawing Sheets

(56) References Cited

U.S. PATENT DOCUMENTS

| | | | |
|---|---|---|---|
| 10,786,900 B1* | 9/2020 | Bohez | G06N 20/00 |
| 2006/0184491 A1 | 8/2006 | Gupta et al. | |
| 2015/0217449 A1* | 8/2015 | Meier | G05D 1/0088 901/1 |
| 2020/0130177 A1 | 4/2020 | Kolouri et al. | |

FOREIGN PATENT DOCUMENTS

| | | |
|---|---|---|
| DE | 102018201949 A1 | 8/2019 |
| DE | 102019131385 A1 | 5/2020 |

OTHER PUBLICATIONS

Abdullah, Mohammed Amin, et al. "Wasserstein robust reinforcement learning." arXiv preprint arXiv:1907.13196. Published 2019.*

Law, Marc T., et al. "Closed-form training of mahalanobis distance for supervised clustering." Proceedings of the IEEE Conference on Computer Vision and Pattern Recognition. Published 2016.*

Blind Review Yang et al., "Projection-Based Constrained Policy Optimization," Accessed Jun. 6, 2024.*

OpenReview page detailing the original publication date of Yang et al., accessed Jun. 6, 2024.*

Schulman et al., "Trust Region Policy Optimization," Proceedings of the 31st International Conference on Machine Learning, JMLR: W&Cp, vol. 37, 2015, pp. 1-9. <http://proceedings.mlr.press/v37/schulman15.pdf> Downloaded Sep. 10, 2021.

Abdolmaleki et al., "Model-Based Relative Entropy Stochastic Search," Advances in Neural Information Processing Systems, 2015, pp. 1-9. <https://papers.nips.cc/paper/2015/file/36ac8e558ac7690b6f44e2cb5ef93322-Paper.pdf> Downloaded Sep. 10, 2021.

Akrour et al., "Projections for Approximate Policy Iteration Algorithms," Proceedings of the 36th International Conference on Machine Learning, PMLR, vol. 97, 2019, pp. 1-10. <http://proceedings.mlr.press/v97/akrour19a/akrour19a.pdf> Downloaded Sep. 10, 2021.

Amos et al., "Optnet: Differentiable Optimization as a Layer in Neural Networks," Proceedings of the 34th International Conference on Machine Learning, PMLR, vol. 70, 2017, pp. 1-10. <https://dl.acm.org/doi/pdf/10.5555/3305381.3305396>Downloaded Sep. 10, 2021.

* cited by examiner

DEVICE AND METHOD FOR CONTROLLING A ROBOTIC DEVICE

CROSS REFERENCE

The present application claims the benefit under 35 U.S.C. § 119 of German Patent Application No. DE 102020211648.2 filed on Sep. 17, 2020, which is expressly incorporated herein by reference in its entirety.

FIELD

Various exemplary embodiments relate in general to a device and a method for controlling a robotic device.

BACKGROUND INFORMATION

Robotic devices may be controlled using robot control models. For this purpose, a robot control model may be trained with the aid of machine learning, for example reinforcement learning. In the process, with the aid of an objective-directed policy for a present state of the robotic device, the robot control model may select an action to be carried out by the robotic device. The policy for a particular state of multiple states is mapped onto an action of multiple actions. The policy may be updated during the training of the robot control model and/or during the inference of the trained robot control model. It may be desirable and/or necessary for there to be a similarity between the initial policy and the updated policy within a predefined region (a trust region, for example).

Trust region policy optimization (TRPO) is described in Schulman et al., "Trust Region Policy Optimization," ICML, Proceedings of Machine Learning Research, 37, 2015, in which a policy update takes place under a condition in such a way that the updated policy is within a trust region. The condition is a heuristic approximation of the Kullback-Leibler (KL) divergence between the initial policy and the updated policy, using an average KL divergence.

However, in reinforcement learning the exploration-exploitation compromise (also referred to as exploration-exploitation dilemma) must be taken into account.

It is described in Abdolmaleki et al., "Model-based relative entropy stochastic search," Advances in Neural Information Processing Systems, 2015, that if the entropy of the updated policy is not taken into account in updating the policy, this may result in a premature policy convergence due to intensified exploitation. For the policy update within the trust region, the entropy of the policy may also be considered as an additional condition.

Akrour et al., "Projections for Approximate Policy Iteration Algorithms," ICLR, 2019, build on the TRPO method described by Schulman et al. and the additional condition of policy entropy described by Abdolmaleki et al., an updated condition-limited policy being projected onto a condition-unlimited policy.

However, the condition used for TRPO, and thus also the projection of same, is based on the average KL divergence over all states. Therefore, individual states of the projected policy could violate the condition of the trust region (for example, could be outside the trust region). As a result, it could be necessary to provide a method that is able to ensure the trust region for each state during the update of the policy.

In addition, the described trust region policy optimization and the projection of the policy are limited to the averaged KL divergence. Therefore, it could be helpful and/or necessary for the projection of a policy onto a trust region to use other mathematical methods, for example methods that are better suited mathematically (for example, mathematical methods that require less computing complexity, such as mathematical methods that may be solved in closed form).

Furthermore, it could be advantageous, and/or for an end-to-end training of the robot control model, necessary, to provide a method for projecting the policy onto a trust region, with the aid of which the policy projection may be implemented as one or multiple differentiable layers in a neural network.

A method is described in Amos and Kolter, "OptNet: Differentiable Optimization as a Layer in Neural Networks," 34th International Conference on Machine Learning, 2017, which allows optimization problems to be integrated as differentiable layers into a neural network (OptNet).

SUMMARY

A method and device in accordance with example embodiments of the present invention may allow a robot control model to be trained in such a way that a trust region (a particular trust region, for example) is ensured for each state of the robot control model during an update of the policy of the robot control model.

Consequently, the device and the method for controlling a robotic device in accordance with example embodiments of the present invention are able to train the robot control model more efficiently (for example more quickly, for example with greater accuracy, for example with an improved exploration-to-exploitation ratio).

A robot control model may be a model that is based on machine learning. The robot control model may include a reinforcement learning algorithm, for example. According to various exemplary embodiments, at least a portion of the robot control model may be implemented with the aid of a neural network.

A robotic device may be any type of computer-controlled device, such as a robot (for example, a manufacturing robot, a maintenance robot, a household robot, a medical robot, etc.), a vehicle (an autonomous vehicle, for example), a household appliance, a production machine, a personal assistant, an access control system, etc.

Due to projecting the updated policy of the robot control model in such a way that the trust region is ensured for each state of the robot control model, for example the exploration-exploitation compromise may be controlled (for example improved, for example optimized) during the reinforcement learning.

In accordance with an example embodiment of the present invention, the ascertainment of the updated policy using the carried-out sequence of actions may include: ascertaining a particular reward for each carried-out action of the carried-out sequence of actions by applying a reward function to the particular resulting state; and ascertaining the updated policy, using the initial policy and the ascertained rewards, in such a way that an expected reward is maximized. The features described in this paragraph in combination with the first example form a second example.

In accordance with an example embodiment of the present invention, the projection of the updated policy onto the projected policy may include: projecting the updated policy onto the projected policy in such a way that for each state of the plurality of states of the projected policy: a similarity value according to the similarity metric between the projected policy and the updated policy is maximized, a similarity value according to the similarity metric between the projected policy and the initial policy is greater than the predefined threshold value, and an entropy of the projected policy is greater than or equal to a predefined entropy threshold value. The features described in this paragraph in combination with the first example or the second example form a third example.

The condition that the entropy for each state of the plurality of states of the projected policy is greater than or equal to a predefined entropy threshold value may result, for example, in not only the covariance, but also the expected value of the multivariate normal distribution of the projected policy being changed during updating of the policy.

In accordance with an example embodiment of the present invention, the initial policy may include an initial multivariate normal distribution of the plurality of actions. The updated policy may include an updated multivariate normal distribution of the plurality of actions. The projected policy may include a projected multivariate normal distribution of the plurality of actions. The projection of the updated policy onto the projected policy may include: projecting the updated policy onto the projected policy in such a way that for each state of the plurality of states of the projected policy: a similarity value according to the similarity metric between the projected multivariate normal distribution and the updated multivariate normal distribution is maximized, and a similarity value according to the similarity metric between the projected multivariate normal distribution and the initial multivariate normal distribution is greater than the predefined threshold value. The features described in this paragraph in combination with one or multiple of the first example through the third example form a fourth example.

The projection of the updated policy onto the projected policy may include: projecting the updated policy onto the projected policy in such a way that for each state of the plurality of states of the projected policy: a similarity value according to the similarity metric between the projected multivariate normal distribution and the updated multivariate normal distribution is maximized, and a similarity value according to the similarity metric between the projected multivariate normal distribution and the initial multivariate normal distribution is greater than the predefined threshold value; and an entropy of the projected multivariate normal distribution is greater than or equal to the predefined entropy threshold value. The features described in this paragraph in combination with the third example and the fourth example form a fifth example.

The projection of the updated policy onto the projected policy in such a way that for each state of the plurality of states of the projected policy, a similarity value according to the similarity metric between the projected multivariate normal distribution and the updated multivariate normal distribution is maximized, and a similarity value according to the similarity metric between the projected multivariate normal distribution and the initial multivariate normal distribution is greater than the predefined threshold value, may include: ascertaining the projected multivariate normal distribution using the initial multivariate normal distribution, the updated multivariate normal distribution, and the predefined threshold value with the aid of the Mahalanobis distance and the Frobenius norm. The features described in this paragraph in combination with the fourth example or the fifth example form a sixth example.

The projection of the updated policy onto the projected policy in such a way that for each state of the plurality of states of the projected policy, a similarity value according to the similarity metric between the projected multivariate normal distribution and the updated multivariate normal distribution is maximized, and a similarity value according to the similarity metric between the projected multivariate normal distribution and the initial multivariate normal distribution is greater than the predefined threshold value, may include: ascertaining the projected multivariate normal distribution using the initial multivariate normal distribution, the updated multivariate normal distribution, and the predefined threshold value with the aid of the Wasserstein distance. The features described in this paragraph in combination with the fourth example or the fifth example form a seventh example.

Use of the Mahalanobis distance and the Frobenius norm according to the sixth example or the Wasserstein distance according to the seventh example has the effect that the projection of the updated policy may be ascertained in a mathematically closed form. For example, the projected policy ascertained in this way may be integrated as a layer (or multiple layers) into a neural network.

The projection of the updated policy onto the projected policy in such a way that for each state of the plurality of states of the projected policy, a similarity value according to the similarity metric between the projected multivariate normal distribution and the updated multivariate normal distribution is maximized, and a similarity value according to the similarity metric between the projected multivariate normal distribution and the initial multivariate normal distribution is greater than the predefined threshold value, may include: ascertaining the projected multivariate normal distribution using the initial multivariate normal distribution, the updated multivariate normal distribution, and the predefined threshold value with the aid of a numerical optimizer. The features described in this paragraph in combination with the fourth example or the fifth example form an eighth example.

The numerical optimizer may ascertain the projected multivariate normal distribution using the Kullback-Leibler divergence. The feature described in this paragraph in combination with the eighth example forms a ninth example.

The ascertainment of the projected multivariate normal distribution may include a Lagrange multiplier method. The feature described in this paragraph in combination with one or multiple of the sixth example through the ninth example forms a tenth example.

The robot control model may be a neural network. The feature described in this paragraph in combination with one or multiple of the first example through the tenth example forms an eleventh example.

The projection of the updated policy onto the projected policy may be implemented as one or multiple layers (as differentiable layers, for example) in the neural network. The feature described in this paragraph in combination with the eleventh example forms a twelfth example.

The integration of the projection of the policy into a trust region for each state as one or multiple differentiable layers into a neural network has the effect that the neural network may be trained end-to-end using the policy projection, the condition of the trust region being ensured for each state during the training.

The adaptation of the robot control model for implementing the projected policy may include an adaptation of the robot control model with the aid of a gradient method. The feature described in this paragraph in combination with one or multiple of the first example through the twelfth example forms a thirteenth example.

The control of the robotic device using the adapted robot control model may include: carrying out one or multiple actions by the robotic device, using the adapted robot control model; updating the policy with the aid of a regression, using the carried-out one or multiple actions. The features described in this paragraph in combination with one or multiple of the first example through the thirteenth example form a fourteenth example.

The control of the robotic device using the adapted robot control model may include: carrying out one or multiple actions by the robotic device, using the adapted robot control model; updating the policy, using the carried-out one or multiple actions, in such a way that a difference between an expected reward and a similarity value according to the similarity metric between the projected policy and the updated policy is maximized. The features described in this paragraph in combination with one or multiple of the first example through the thirteenth example form a fifteenth example.

In accordance with an example embodiment of the present invention, a method for controlling a robotic device may include: carrying out a sequence of actions by the robotic device using a robot control model, the carrying out of each action of the sequence of actions including: ascertaining an action for a present state of a plurality of states of the robotic device with the aid of the robot control model, using an initial policy, carrying out the ascertained action by the robotic device, and ascertaining the state of the robotic device resulting from the carried-out action; ascertaining an updated policy using the carried-out sequence of actions; ascertaining a projected policy in such a way that a difference between a reward expected for the projected policy and a similarity value according to the similarity metric between each state of the plurality of states of the projected policy and the updated policy is maximized; adapting the robot control model for implementing the projected policy; and controlling the robotic device using the adapted robot control model. The method having the features described in this paragraph forms a sixteenth example.

In accordance with an example embodiment of the present invention, a method for controlling a robotic device may include: carrying out a sequence of actions by the robotic device using a robot control model, the carrying out of each action of the sequence of actions including: ascertaining an action for a present state of a plurality of states of the robotic device with the aid of the robot control model, using an initial policy, carrying out the ascertained action by the robotic device, and ascertaining the state of the robotic device resulting from the carried-out action; ascertaining an updated policy using the carried-out sequence of actions; ascertaining a projected policy in such a way that a difference between a reward expected for the projected policy and a similarity value according to the similarity metric between each state of the plurality of states of the projected policy and the updated policy is maximized; and controlling the robotic device with the aid of the robot control model, using the projected policy. The method having the features described in this paragraph forms a seventeenth example.

A computer program product may store program instructions which, when executed, carry out the method according to one or multiple of the first example through the seventeenth example. The computer program product having the features described in this paragraph forms a nineteenth example.

A nonvolatile memory medium may store program instructions which, when executed, carry out the method according to one or multiple of the first example through the seventeenth example. The nonvolatile memory medium having the features described in this paragraph forms a twentieth example.

A nonvolatile memory medium may store program instructions which, when executed, carry out the method according to one or multiple of the first example through the seventeenth example. The nonvolatile memory medium having the features described in this paragraph forms a twenty-first example.

Exemplary embodiments of the present invention are illustrated in the figures and explained in greater detail below.

DETAILED DESCRIPTION OF EXAMPLE EMBODIMENTS

In one specific embodiment, a "computer" may be understood as any type of logic-implementing entity, which may be hardware, software, firmware, or a combination thereof. Therefore, in one specific embodiment a computer may be a hard-wired logic circuit or a programmable logic circuit, such as a programmable processor, for example a microprocessor (for example, a CISC (processor including a large instruction set) or a RISC (processor including a reduced instruction set)). A computer may include one or multiple processors. A computer may also be software that is implemented or executed by a processor, for example any type of computer program, for example a computer program that uses a virtual machine code such as Java. In accordance with one alternative specific embodiment, any other type of implementation of the particular functions, described in greater detail below, may be understood as a computer.

Robotic devices may be controlled using reinforcement learning-based robot control models. To ensure an improved (optimal, for example) compromise of exploration and exploitation when updating the policy of the robot control model, it may be necessary to update the policy within a trust region. Various exemplary embodiments relate to a device and a method for controlling a robotic device which are able to train a robot control model in such a way that an updated policy is present within the trust region for each state of the robotic device. The trust region for each state of the robotic device may be taken into account and ensured when updating the policy of the robot control model.

Figure 1:
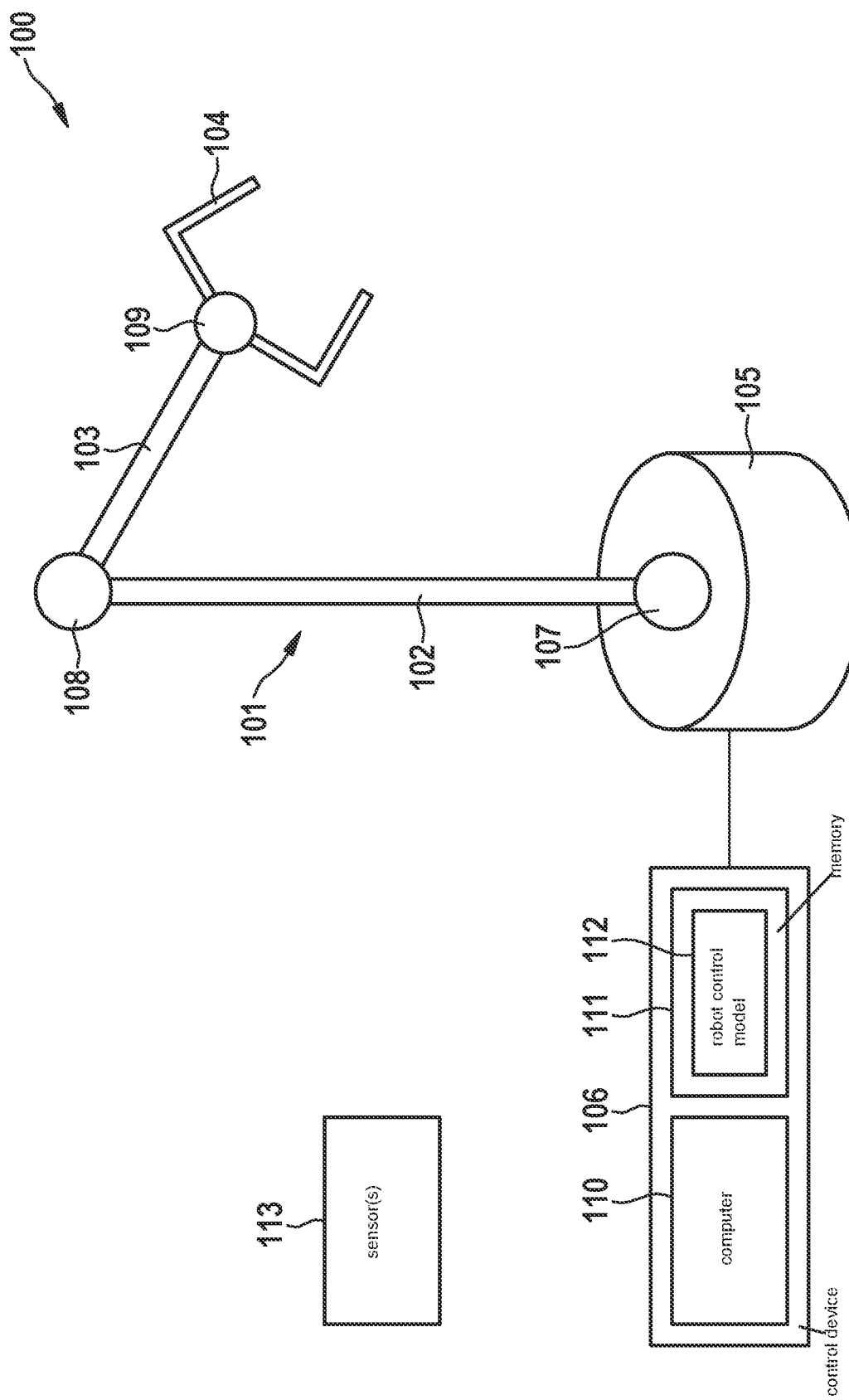
FIG. 1 shows an example of a robotic device system according to various specific embodiments of the present invention.

FIG. 1 shows a robotic device system 100. Robotic device system 100 may include a robotic device 101. Robotic device 101 shown in FIG. 1 and described by way of example below represents an example of a robotic device for the purpose of illustration, and, may include, for example an industrial robot in the form of a robot arm for moving, mounting, or machining a workpiece. It is pointed out that the robotic device may be any type of computer-controlled device, such as a robot (for example, a manufacturing robot, a maintenance robot, a household robot, a medical robot, etc.), a vehicle (an autonomous vehicle, for example), a household appliance, a production machine, a personal assistant, an access control system, etc.

Robotic device 101 includes robot members 102, 103, 104 and a base (or in general a mounting) 105 via which robot members 102, 103, 104 are supported. The term "robot member" refers to the movable parts of robotic device 101, whose actuation allows a physical interaction with the surroundings, for example to perform a task, for example to carry out an action.

For control, robotic device system 100 includes a control device 106 that is configured to achieve the interaction with the surroundings according to a control program. Last element 104 (viewed from base 105) of robot members 102, 103, 104 is also referred to as an end effector 104, and may include one or multiple tools such as a welding torch, a gripping tool, a painting device, or the like.

The other robot members 102, 103 (closer to base 105) may form a positioning device, so that together with end effector 104, a robot arm (or articulated arm) with end effector 104 at its end is provided. The robot arm is a mechanical arm that may fulfill functions similarly to a human arm (possibly including a tool at its end).

Robotic device 101 may include connecting elements 107, 108, 109 that connect robot members 102, 103, 104 to one another and to base 105. A connecting element 107, 108, 109 may include one or multiple articulated joints, each of which may provide a rotational movement and/or a translational movement (i.e., a displacement) for associated robot members relative to one another. The movement of robot members 102, 103, 104 may be initiated with the aid of actuators that are controlled by control device 106.

The term "actuator" may be understood as a component that is suitable for influencing a mechanism as a response to the actuator being driven. The actuator may convert instructions (so-called activation), output by control device 106, into mechanical movements. The actuator, for example an electromechanical converter, may be configured to convert electrical energy into mechanical energy as a response to the actuator being activated.

The term "control device" may be understood as any type of logical implementation unit, which may include a circuit and/or a processor, for example, that is able to execute software, firmware, or a combination of same stored in a memory medium, and that may issue instructions, for example to an actuator in the present example. The control device may be configured to control the operation of a system, in the present example a robot, using program code (software, for example).

In the present example, control device 106 includes a computer 110, and a memory 111 that stores code and data on the basis of which computer 110 controls robotic device 101. According to various specific embodiments, control device 106 controls robotic device 101 based on a robot control model 112 stored in memory 111.

According to various specific embodiments, robotic device system 100 may include one or multiple sensors 113. The one or multiple sensors 113 may be configured to provide sensor data that characterize a state of the robotic device. For example, the one or multiple sensors 113 may include an imaging sensor such as a camera (for example, a standard camera, a digital camera, an infrared camera, a stereo camera, etc.), a radar sensor, a LIDAR sensor, a position sensor, a speed sensor, an ultrasonic sensor, an acceleration sensor, a pressure sensor, etc.

Robotic device 101 may be in a state $s_t$ of a plurality of states. According to various specific embodiments, at any point in time robotic device 101 may be in a present state of the plurality of states. The particular state of the plurality of states may be ascertained using the sensor data provided by the one or multiple sensors 113.

Robotic device 101 may be configured to carry out a plurality of actions. The actions of the plurality of actions may, for example, be predefined in the program code of control device 106. One or multiple actions of the plurality of actions may include, for example, a mechanical movement of one or multiple robot members 102, 103, 104. One or multiple actions of the plurality of actions may include, for example, an action of the end effector (for example gripping, for example releasing, etc.). According to various specific embodiments, carried-out action $a_t$ in a present state $s_t$ of robotic device 101 may result in a resulting state of the plurality of states of robotic device 101.

Robot control model 112 may be a reinforcement learning-based model. For example, robot control model 112 may implement a reinforcement learning algorithm.

Robot control model 112 may be configured to ascertain an action of the plurality of actions for a state of the plurality of states. For example, robot control model 112 may output an action of the plurality of actions to an input of a state of the plurality of states. Robot control model 112 may map from a state of the plurality of states onto an action of the plurality of actions. The states of the plurality of states may form a state space. The actions of the plurality of actions may form an action space. Robot control model 112 may map from the state space onto the action space.

According to various specific embodiments, robot control model 112 may include a policy 7. For example, robot control model 112 may pursue a policy at any point in time. A particular policy may be associated with an objective and/or a task. For example, a particular policy may be a policy for achieving the objective or for fulfilling the task. According to various specific embodiments, a policy may output an action of the plurality of actions to an input of a state of the plurality of states. The policy used by robot control model 112 may map from the state space onto the action space.

A particular probability distribution (a normal distribution, for example) of the plurality of actions may be associated with each state of the plurality of states. According to various specific embodiments, a policy may include or be a multivariate normal distribution (also referred to as a multidimensional normal distribution and/or as a multivariate Gaussian distribution). A multivariate normal distribution may be defined by an expected value vector and a covariance matrix. The expected value vector of the multivariate normal distribution of a policy may include an expected value for each state of the plurality of states. The covariance matrix (also referred to herein as covariance) of the multivariate normal distribution of a policy may be dependent on the plurality of states (for example, may be a function of same).

According to various specific embodiments, control device 106 may be configured to control robotic device 101 in such a way that robotic device 101 executes and/or carries out the action ascertained by robot control model 112 for the present state of robotic device 101, using the present policy.

Control device 106 may be configured to ascertain a reward $\mathcal{R}$ for the state of robotic device 101 resulting from the carried-out action. According to various specific embodiments, control device 106 may ascertain the reward for a resulting state, using a reward function. The algorithm for carrying out the reward function may be stored in memory 111, for example. For example, robot control model 112 may be configured to carry out the reward function. The reward ascertained for the resulting state may, for example, be associated with or be the carried-out action in conjunction with the initial state of robotic device 101.

According to various specific embodiments, robotic device 101 may carry out a sequence of actions, using robot control model 112. Control device 106 may be configured to ascertain each action of the sequence of actions, using an initial policy $$\pi_{\theta_{old}}.$$

Control device 106 may be configured to ascertain a particular reward for each carried-out action of the carried-out sequence of actions.

Control device 106 (for example, computer 110 of control device 106) may be configured to ascertain an updated policy $\pi_\theta$, using the carried-out sequence of actions. Control device 106 may be configured to ascertain updated policy $\pi_\theta$ in such a way that the expected reward given in equation (1) is increased (maximized, for example):

$$\mathbb{E}_\tau\left[\sum_{t=0}^{\infty}\gamma^t \mathcal{R}(s_t, a_t)\right], \quad (1)$$

where $\tau=s_0, a_0, \ldots$ is the trajectory of states $s_t$ and of actions $a_t$ that are run through using the policy for achieving the objective or for fulfilling the task, where $\gamma$ is the discount factor, and where $s_0 \sim \rho(s_0)$, $a_t \sim \pi(a_t|s_t)$ and $s_{t+1} \sim P(s_{t+1}|s_t, a_t)$.

A policy $\pi_\theta$ may be defined by parameters $\theta$ of robot control model 112; for example, $\pi_\theta$ may be parameterized by $\theta$.

According to various specific embodiments, an updated policy $\pi_\theta$ may be ascertained using equation (2):

$$\max_\theta \mathbb{E}_{(s_t,a_t)\sim\pi_{\theta_{old}}}\left[\frac{\pi_\theta(a_t|s_t)}{\pi_{\theta_{old}}(a_t|s_t)}A^\pi(s_t, a_t)\right], \quad (2)$$

where $$\pi_{\theta_{old}}$$

is the initial policy (for example, the previously used policy), and where $A^\pi(a_t, s_t)$ is the advantage function. The advantage function may be ascertained, for example, by $A^\pi(a_t, s_t) = Q^\pi(a_t, s_t) - V^\pi(s_t)$, where $Q^\pi(a_t, s_t)$ is the action value function and is $V^\pi(s_t)$ the value function.

According to various specific embodiments, updated policy $\pi_\theta$ may be ascertained using importance sampling.

According to various specific embodiments, updated policy $\pi_\theta$ may be subject to one or multiple conditions (for example boundary conditions, for example constraints) with regard to initial policy $$\pi_{\theta_{old}}.$$

For example, a condition may be that updated policy $\pi_\theta$ is within a trust region with regard to initial policy $$\pi_{\theta_{old}}$$

(for example, robot control model 112 may implement trust range-based reinforcement learning). For example, a condition may be that a similarity value according to a similarity metric between updated policy $\pi_\theta$ and initial policy $$\pi_{\theta_{old}}$$

for each state $s_t$ of the plurality of states is greater than a predefined threshold value. For example, a similarity value according to the similarity metric between the policy to be used and initial policy $$\pi_{\theta_{old}}$$

for each state $s_t$ of the plurality of states may be greater than a predefined threshold value if a distance d between updated policy $\pi_\theta$ and initial policy $$\pi_{\theta_{old}}$$

is less than or equal to predefined threshold value $\epsilon$. According to various specific embodiments, a particular predefined threshold value $\epsilon$ may be associated with each state of the plurality of states. For example, with regard to equation (2), the condition (s.t.) that a similarity value according to the similarity metric between updated policy $\pi_\theta$ and initial policy $$\pi_{\theta_{old}}$$

for each state $s_t$ of the plurality of states is greater than predefined threshold value $\epsilon$ may be described according to equation (3):

$$d(\pi_{\theta_{old}}(\cdot|s_t)), \pi_\theta(\cdot|s_t)) \leq \epsilon(s_t). \quad (3).$$

The updated policy may be limited for each point (state, for example) in the state space. Updating the policy within the trust region has the effect that the policy approaches the optimal policy in increments that are not too large (for example, converges with same). A measure for a change in the policy used may be limited.

According to various specific embodiments, a condition may be that an entropy $\mathcal{H}$ of updated policy $\pi_\theta$ for each state $s_t$ of the plurality of states is greater than or equal to a predefined entropy threshold value $\beta$. For example, the condition with regard to equation (2) may be described according to equation (4):

$$\mathcal{H}(\pi(\cdot|s_t)) \geq \beta(s_t) \quad (4).$$

Use of the conditions regarding updated policy $\pi_\theta$ according to equation (3) and optionally also equation (4) allows control over exploration and exploitation of the reinforcement learning of robot control model 112.

According to various specific embodiments, equation (2) together with the conditions according to equations (3) and (4) may be defined with the aid of equation (5):

$$\max_{\pi} \mathbb{E}_{x \sim \pi_{old}} \left[ \frac{\pi(x)}{\pi_{old}(x)} \mathcal{R}(x) \right] \quad (5)$$

$$\text{s.t. } d(\pi(x), \pi_{old}(x)) \le \epsilon,$$

$$\mathcal{H}(\pi(x)) \ge \beta.$$

Figure 2:
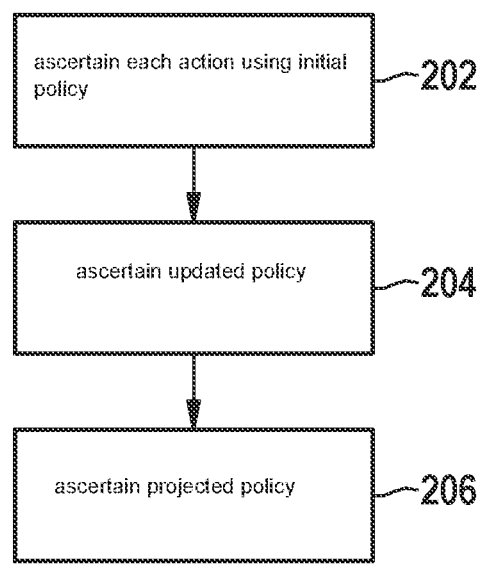
FIG. 2 shows a flowchart for ascertaining a policy according to various specific embodiments of the present invention.

With reference to FIG. 2, robot control model 112 may ascertain each action of the sequence of actions, using initial policy $$\pi_{\theta_{old}}$$

(in 202). As described herein, control device 106 may ascertain updated policy $\pi_\theta$ according to equation (2) (in 204), it being possible for updated policy $\pi_\theta$ to be limited by the conditions defined in equation (3) and optionally also in equation (4). Updated policy $\pi_\theta$ may be a limited updated policy $\pi_\theta$. Updated policy $\pi_\theta$ may be limited for each state of the plurality of states (for example, subject to the condition according to equation (3)). Updated policy $\pi_\theta$ may be an updated policy $\pi_\theta$ that is limited for each individual state. For example, each state of the plurality of states may have a particular predefined threshold value $\epsilon$, so that predefined threshold value $\epsilon$ may be a predefined threshold value vector.

Control device 106 may be configured to ascertain a projected policy $\tilde{\pi}$ (in 206). Control device 106 may be configured to project updated policy $\pi_\theta$ onto a projected policy $\tilde{\pi}$. Control device 106 may be configured to project updated policy $\pi_\theta$ onto projected policy $\tilde{\pi}$ in such a way that for each state of the plurality of states of projected policy $\tilde{\pi}$, a similarity value according to a similarity metric between projected policy $\tilde{\pi}$ and updated policy $\pi_\theta$ is increased (maximized, for example). Control device 106 may be configured to project updated policy $\pi_\theta$ onto projected policy $\tilde{\pi}$ in such a way that for each state of the plurality of states of projected policy $\tilde{\pi}$, a similarity value according to the similarity metric between projected policy $\tilde{\pi}$ and updated policy $\pi_\theta$ is increased (maximized, for example), and that for each state of the plurality of states of projected policy $\tilde{\pi}$, a similarity value according to the similarity metric between projected policy $\tilde{\pi}$ and initial policy $$\pi_{\theta_{old}}$$

is greater than predefined threshold value $\epsilon$. Control device 106 may be configured to project updated policy $\pi_\theta$ onto projected policy $\tilde{\pi}$ in such a way that for each state of the plurality of states of projected policy $\tilde{\pi}$, a similarity value according to the similarity metric between projected policy $\tilde{\pi}$ and updated policy $\pi_\theta$ is increased (maximized, for example), that for each state of the plurality of states of projected policy $\tilde{\pi}$, a similarity value according to the similarity metric between projected policy $\tilde{\pi}$ and initial policy $$\pi_{\theta_{old}}$$

is greater than predefined threshold value $\epsilon$, and that for each state of the plurality of states of projected policy $\tilde{\pi}$, entropy $\mathcal{H}$ of updated policy $\pi_\theta$ for each state $s_t$ of the plurality of states is greater than or equal to predefined entropy threshold value $\beta$.

According to various specific embodiments, a particular policy may be described with the aid of an associated multivariate normal distribution. For example, initial policy $$\pi_{\theta_{old}}$$

may include an initial multivariate normal distribution of the plurality of actions. The initial multivariate normal distribution may be described by:

$$\pi_{\theta_{old}}$$

(a|s)= $\mathcal{N}$ (a|$\mu_{old}$(s),$\Sigma_{old}$(s)), where $\mu_{old}$(s) is the initial expected value vector and $\Sigma_{old}$ is the initial covariance of the initial multivariate normal distribution. For example, updated policy $\pi_\theta$ may include an updated multivariate normal distribution of the plurality of actions. The updated multivariate normal distribution may be described by: $\pi_\theta$(a|s)= $\mathcal{N}$ (a|$\mu$(s),$\Sigma$(s)), where $\mu$ is the updated expected value vector and $\Sigma$ is the updated covariance of the updated multivariate normal distribution. The initial expected value vector, the initial covariance, the updated expected value vector, and/or the updated covariance may be a function of the plurality of states. For example, projected policy $\tilde{\pi}$ may include a projected multivariate normal distribution of the plurality of actions. The projected multivariate normal distribution may be described by:

$$\tilde{\pi}(a|s) = \mathcal{N}(a|\tilde{\mu}(\mu_{old}, \mu, \Sigma_{old}, \Sigma, \epsilon(s)), \tilde{\Sigma}(\mu_{old}, \mu, \Sigma_{old}, \Sigma, \epsilon(s), \beta(s))),$$

where $\tilde{\mu}$ is the projected expected value vector and $\tilde{\Sigma}$ is the projected covariance of the projected multivariate normal distribution.

The projected expected value vector may be a function of the initial expected value vector, the updated expected value vector, the initial covariance, the updated covariance, the predefined threshold value, and/or the plurality of states. The projected covariance may be a function of the initial expected value vector, the updated expected value vector, the initial covariance, the updated covariance, the predefined threshold value, the plurality of states, and/or the predefined entropy threshold value.

Control device 106 may be configured to project updated policy $\pi_\theta$ onto projected policy $\tilde{\pi}$ in such a way that for each state of the plurality of states of projected policy $\tilde{\pi}$, a similarity value according to a similarity metric between the projected multivariate normal distribution and the updated multivariate normal distribution is increased (maximized, for example). Control device 106 may be configured to project updated policy $\pi_\theta$ onto projected policy $\tilde{\pi}$ in such a way that for each state of the plurality of states of projected policy $\tilde{\pi}$, a similarity value according to the similarity metric between the projected multivariate normal distribution and the updated multivariate normal distribution is increased (maximized, for example), and that for each state of the plurality of states of projected policy $\tilde{\pi}$, a similarity value according to the similarity metric between the projected multivariate normal distribution and the initial multivariate normal distribution is greater than predefined threshold value $\epsilon$. Control device 106 may be configured to project updated policy $\pi_\theta$ onto projected policy $\tilde{\pi}$ in such a way that for each state of the plurality of states of projected policy $\tilde{\pi}$, a similarity value according to the similarity metric between the projected multivariate normal distribution and the updated multivariate normal distribution is increased (maximized, for example), that for each state of the plurality of states of projected policy Fr, a similarity value according to the similarity metric between the projected multivariate normal distribution and the initial multivariate normal distribution is greater than predefined threshold value $\epsilon$, and that for each state of the plurality of states of the projected multivariate normal distribution, entropy $\mathcal{H}$ of the updated St [sic] multivariate normal distribution for each state $s_t$ of the plurality of states is greater than or equal to predefined entropy threshold value $\beta$.

As described herein, a similarity value may be described according to the similarity metric, using a distance d. According to various specific embodiments, the similarity value according to the similarity metric between the projected multivariate normal distribution of projected policy $\tilde{\pi}$ and the updated multivariate normal distribution of updated policy $\pi_\theta$ may have a distance d between the projected multivariate normal distribution of projected policy $\tilde{\pi}$ and the updated multivariate normal distribution. According to various specific embodiments, the similarity value according to the similarity metric between the projected multivariate normal distribution of projected policy $\tilde{\pi}$ and the initial multivariate normal distribution of initial policy $$\pi_{\theta_{old}}$$

may have a distance d between the projected multivariate normal distribution of projected policy $\tilde{\pi}$ and the initial multivariate normal distribution of initial policy $$\pi_{\theta_{old}}.$$

According to various specific embodiments, the optimization problem for ascertaining projected policy $\tilde{\pi}$ may be described according to equations (6) through (8):

$$\min_{\tilde{\pi}} d(\tilde{\pi}, \pi_\theta) \qquad (6)$$

$$\text{s.t. } d(\tilde{\pi}, \pi_{\theta_{old}}) \leq \epsilon, \qquad (7)$$

$$\mathcal{H}(\tilde{\pi}) \geq \beta. \qquad (8)$$

According to various specific embodiments, the projection of updated policy $\pi_\theta$ onto projected policy $\tilde{\pi}$ may take place in such a way that projected policy $\tilde{\pi}$ is an unlimited projected policy $\tilde{\pi}$. Projected policy $\tilde{\pi}$ may be ascertained in such a way that the conditions (cf. equation (6), for example) are met. Updated policy $\pi_\theta$ is projected onto projected policy $\tilde{\pi}$ in such a way that the projected multivariate normal distribution is as close as possible to the updated multivariate normal distribution (for example, that the distance between the projected multivariate normal distribution and the updated multivariate normal distribution is minimal), and that the projected multivariate normal distribution (and thus projected policy $\tilde{\pi}$) meets the conditions.

The projected multivariate normal distribution may be described with the aid of projected expected value vector $\tilde{\mu}$ and projected covariance $\tilde{\Sigma}$. The projection of updated policy $\pi_\theta$ onto projected policy $\tilde{\pi}$ may include ascertaining projected expected value vector $\tilde{\mu}$ and projected covariance $\tilde{\Sigma}$.

The updated multivariate normal distribution may be projected onto the projected multivariate normal distribution under the one or multiple conditions described herein. The updated multivariate normal distribution may be projected onto the projected multivariate normal distribution [in such a way] that the one or multiple conditions described herein are met for each state of the plurality of states.

Three examples of projection methods for ascertaining projected expected value vector $\tilde{\mu}$ and projected covariance $\tilde{\Sigma}$ are described below:

(I) a first projection method using the Mahalanobis distance and the Frobenius norm;

(II) a second projection method using the Wasserstein distance; and (III) a third projection method using a numerical optimizer.

(I) First Projection Method

According to various specific embodiments, equation (6) of the optimization [ahalanobis distance and objected expected value vector $\tilde{\mu}$ and projected covariance $\tilde{\Sigma}$ according to equation (9):

$$\min_{\tilde{\mu}, \tilde{\Sigma}} (\mu - \tilde{\mu})^T \Sigma_{old}^{-1} (\mu - \tilde{\mu}) + \left\| \Sigma - \tilde{\Sigma} \right\|_F^2. \qquad (9)$$

According to various specific embodiments, the expected value vector and the covariance may be independent of one another. For example, the expected value vector and the covariance may be considered independently. For example, the condition according to equation (7) for a predefined threshold value $\epsilon_\mu$ of the expected value vector may be considered according to equation (10), and a predefined threshold value $\epsilon_\Sigma$ of the covariance may be considered according to equation (11):

$$(\mu_{old} - \tilde{\mu})^T \Sigma_{old}^{-1} (\mu_{old} - \tilde{\mu}) \leq \epsilon_\mu \qquad (10)$$

$$\|\Sigma_{old} - \tilde{\Sigma}\|_F^2 \leq \epsilon_\Sigma \qquad (11).$$

A similarity value according to the similarity metric may be considered with regard to the expected value vector, and a similarity value according to the similarity metric may be considered with regard to the covariance. According to various specific embodiments, the optimization problem described according to equations (9) through (11) may be solved using a Lagrange multiplier method. For example, the Lagrange duality of equations (9) through (11) may be described according to Lagrange function $\mathcal{L}(\tilde{\mu}, \tilde{\Sigma}, \omega, \eta)$ of equation (12):

$$\mathcal{L}(\tilde{\mu},\tilde{\Sigma},\omega,\eta) = (\mu-\tilde{\mu})^T \Sigma_{old}^{-1}(\mu-\tilde{\mu}) + \|\Sigma-\tilde{\Sigma}\|_F^2 + \omega((\mu-\tilde{\mu})^T \Sigma_{old}^{-1}(\mu-\tilde{\mu}) - \epsilon_\mu) + \eta(\|\Sigma-\tilde{\Sigma}\|_F^2 - \epsilon_\Sigma) \quad (12)$$

where $\omega$ and $\eta$ are Lagrange multipliers.

Solving equation (12) results in the projected expected value vector according to equation (13) and the projected covariance according to equation (14):

$$\tilde{\mu} = \frac{\mu + \omega \mu_{old}}{1 + \omega} \quad (13)$$

$$\tilde{\Sigma} = \frac{\Sigma + \eta \Sigma_{old}}{1 + \eta}, \quad (14)$$

where $\omega$ may be ascertained according to equation (15), and $\eta$ may be ascertained according to equation (16).

$$\omega = \sqrt{\frac{(\mu_{old}-\mu)^T \Sigma_{old}^{-1}(\mu_{old}-\mu)}{\epsilon_\mu}} - 1 \quad (15)$$

$$\eta = \sqrt{\frac{\|\Sigma_{old}-\Sigma\|_F^2}{\epsilon_\Sigma}} - 1 \quad (16)$$

(II) Second Projection Method

According to various specific embodiments, equation (6) of the optimization problem may be described according to equation (17), using the Wasserstein distance (for example, scaled Wasserstein distance) with regard to projected expected value vector $\tilde{\mu}$ and projected covariance $\tilde{\Sigma}$:

$$\min_{\tilde{\mu},\tilde{\Sigma}} (\mu-\tilde{\mu})^T \Sigma_{old}^{-1}(\mu-\tilde{\mu}) + tr\left(\Sigma_{old}^{-1}\Sigma + \Sigma_{old}^{-1}\tilde{\Sigma} - 2\Sigma_{old}^{-1}\left(\Sigma^{1/2}\tilde{\Sigma}\Sigma^{1/2}\right)^{1/2}\right), \quad (17)$$

where tr is the trace of the matrix.

For two normal distributions, the Wasserstein distance includes a Euclidian distance of the expected values of the two normal distributions. Multiplying by initial covariance $\Sigma_{old}$ and scaling the Wasserstein distance results in the Mahalanobis distance (in this regard, cf. equation (17), for example).

As described herein, the expected value vector and the covariance may be considered independently of one another. For example, the condition according to equation (7) may be considered for predefined threshold value $\epsilon_\mu$ of the expected value vector according to equation (18), and for predefined threshold value $\epsilon_\Sigma$ of the covariance, according to equation (19):

$$(\mu_{old}-\tilde{\mu})^T \Sigma_{old}^{-1}(\mu_{old}-\tilde{\mu}) \leq \epsilon_\mu \quad (18)$$

$$tr\left(\mathbb{I} + \Sigma_{old}^{-1}\tilde{\Sigma} - 2\Sigma_{old}^{-1}\left(\Sigma_{old}^{1/2}\tilde{\Sigma}\Sigma_{old}^{1/2}\right)^{1/2}\right) \leq \epsilon_\Sigma, \quad (19)$$

where $\mathbb{I}$ is the identity matrix (also referred to as information matrix).

According to various specific embodiments, the optimization problem described according to equations (17) through (19) may be solved using a Lagrange multiplier method. Reference is made to equations (13) and (15) for the solution with regard to projected expected value vector $\tilde{\mu}$.

According to various specific embodiments, the optimization problem may be solved with regard to the root of the projected covariance. For example, the Lagrange duality of equations (17) and (19) may be described according to Lagrange function $\mathcal{L}(\tilde{\Sigma}^{1/2},\eta)$ by equation (20).

$$\mathcal{L}(\tilde{\Sigma}^{1/2},\eta) = tr(\Sigma_{old}^{-1}\Sigma + \tilde{\Sigma}^{1/2}\Sigma_{old}^{-1}\tilde{\Sigma}^{1/2} - 2\Sigma^{1/2}\Sigma_{old}^{-1}\tilde{\Sigma}^{1/2}) + \eta(tr(\mathbb{I} + \tilde{\Sigma}^{1/2}\Sigma_{old}^{-1}\tilde{\Sigma}^{1/2} - 2\Sigma_{old}^{-1/2}\tilde{\Sigma}^{1/2}) - \epsilon_\Sigma) \quad (20)$$

Solving equation (20) results in the projected covariance according to equation (21):

$$\tilde{\Sigma}^{1/2} = \frac{\Sigma^{1/2} + \eta \Sigma_{old}^{1/2}}{1 + \eta}, \quad (21)$$

where $\eta$ may be ascertained according to equation (22).

$$\eta = \sqrt{\frac{tr\left(\mathbb{I} + \Sigma_{old}^{-1}\Sigma - 2\Sigma_{old}^{-1/2}\Sigma^{1/2}\right)}{\epsilon_\Sigma}} - 1 \quad (22)$$

The first projection method and the second projection method may thus be solved in a closed form (the projected multivariate normal distribution may be ascertained in a closed form).

(III) Third Projection Method

According to various specific embodiments, the optimization problem may be solved according to equations (6) through (8) with the aid of a numerical optimizer.

Figure 3:
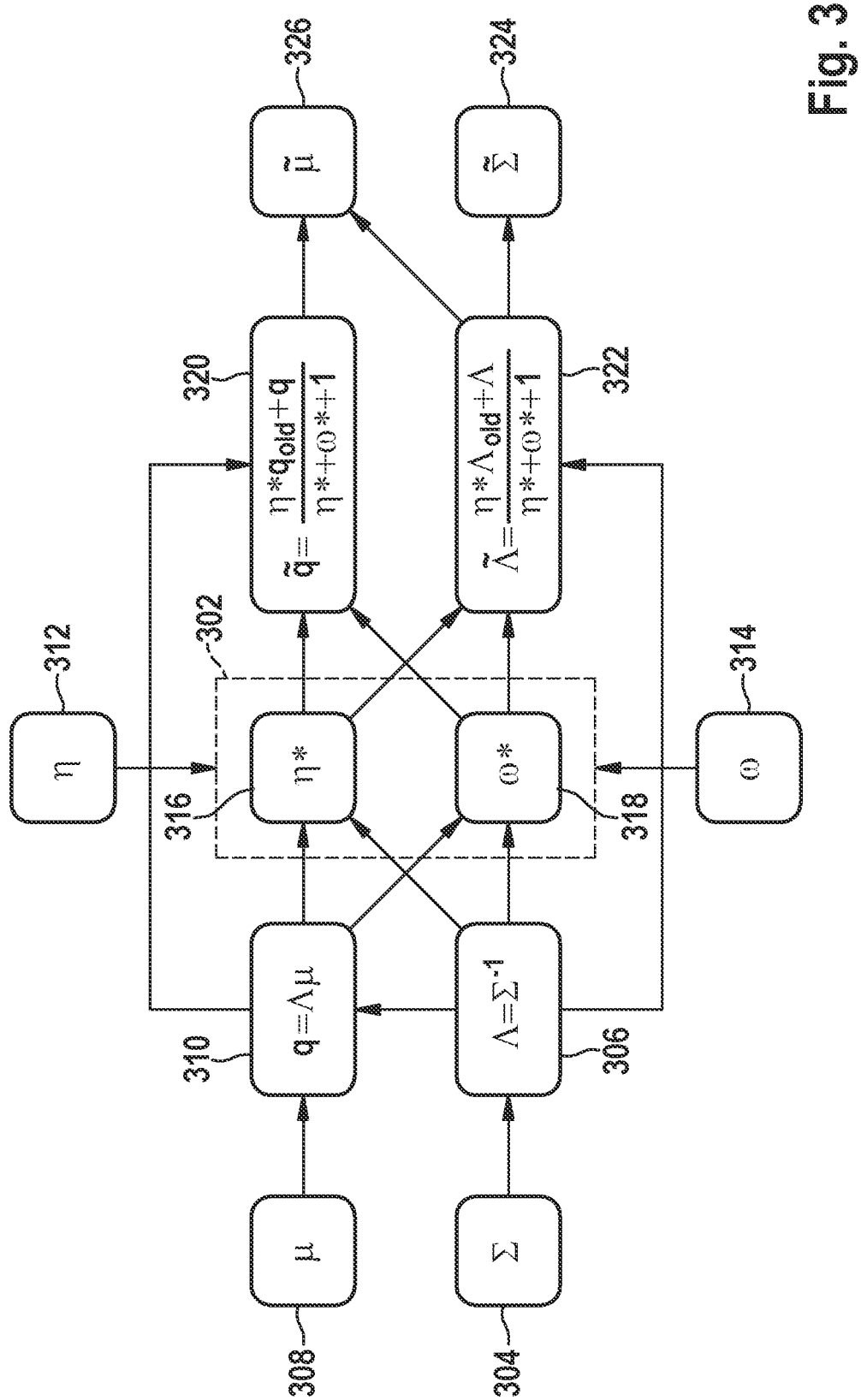
FIG. 3 shows a diagram illustrating an ascertainment of a projected policy, using a numerical optimizer, according to various specific embodiments of the present invention.

FIG. 3 shows a diagram illustrating an ascertainment of a projected policy $\tilde{\pi}$, using a numerical optimizer 302 according to various specific embodiments. For example, control device 106 (for example, computer 110 of control device 106) may be configured to implement numerical optimizer 302.

A multivariate normal distribution may be described with the aid of canonical parameter q (also referred to as natural parameter) and cumulant-generating function $\Lambda$.

Numerical optimizer 302 may be configured to solve the optimization problem according to equations (6) through (8) for a canonical parameter q and a cumulant-generating function $\Lambda$, in that numerical optimizer 302 ascertains a first optimized Lagrange multiplier $\eta^*$ and a second optimized Lagrange multiplier $\omega^*$ for canonical parameter q and cumulant-generating function $\Lambda$. For example, numerical optimizer 302 may ascertain first optimized Lagrange multiplier $\eta^*$ and second optimized Lagrange multiplier $\omega^*$, using the KL divergence.

According to various specific embodiments, for updated covariance $\Sigma$ 304, control device 106 may ascertain updated cumulant-generating function $\Lambda$ 306 according to $\Lambda = \Sigma^{-1}$. For example, control device 106 may ascertain updated canonical parameter q 310 according to $q = \Lambda \mu$ for updated expected value vector $\mu$ 308 and updated cumulant-generating function $\Lambda$ 306.

Numerical optimizer 302 may be configured to ascertain first optimized Lagrange multiplier $\eta^*$ and second optimized Lagrange multiplier $\omega^*$, using updated cumulant-generating function $\Lambda$ 306 and updated canonical parameter q 310.

Numerical optimizer 302 may be configured to ascertain first optimized Lagrange multiplier η* 316 and second optimized Lagrange multiplier ω* 318, using updated cumulant-generating function Λ 306, updated canonical parameter q 310, a first Lagrange multiplier η 312, and a second Lagrange multiplier ω 314. For example, first Lagrange multiplier η 312 and/or second Lagrange multiplier ω 314 may be predefined (set, for example). For example, numerical optimizer 302 may be configured to ascertain first Lagrange multiplier η 312 and/or second Lagrange multiplier ω 314.

Initial cumulant-generating function $\Lambda_{old}$ may be ascertained using initial covariance $\Sigma_{old}$ (for example, based on $\Lambda = \Sigma^{-1}$). Initial canonical parameter $q_{old}$ may be ascertained using the initial cumulant-generating function and the initial expected value vector (for example, based on q=Λμ).

Projected canonical parameter q̃ 320 may be ascertained according to equation (23):

$$\tilde{q} = \frac{\eta^* q_{old} + q}{\eta^* + \omega^* + 1}. \tag{23}$$

Projected cumulant-generating function Λ̃ 322 may be ascertained according to equation (24):

$$\tilde{\Lambda} = \frac{\eta^* \Lambda_{old} + \Lambda}{\eta^* + \omega^* + 1}. \tag{24}$$

Projected covariance Σ̃ 324 may be ascertained using projected cumulant-generating function Λ̃ 322 (for example, based on $\Lambda = \Sigma^{-1}$). Projected expected value vector μ̃ may be ascertained using projected canonical parameter q̃ 320 and projected cumulant-generating function Λ̃ 322 (for example, based on q=Λμ).

It is pointed out that the projection of updated policy $\pi_\theta$ onto projected policy π̃ may also take place with the aid of other than the three projection methods described herein by way of example.

According to various specific embodiments, the projected policy is an optimized policy, and an optimal sequence of states of robotic device 101 and executed and/or carried-out actions of robotic device 101 may be ascertained with the aid of the projected policy and carried out by robotic device 101.

According to various specific embodiments, robot control model 112 may include or be a neural network. The projection of updated policy $\pi_\theta$ onto projected policy π̃ may be implemented as one or multiple layers in the neural network. For example, the projection of updated policy $\pi_\theta$ onto projected policy π̃ may be implemented as one or multiple differentiable layers in the neural network. According to various specific embodiments, the one or multiple layers may be configured in such a way that the projection described herein is carried out if one of the conditions for the updated policy is not met.

According to various specific embodiments, control device 106 may be configured to adapt robot control model 112 for implementing projected policy π̃.

According to various specific embodiments, robot control model 112 may include a neural network, and the adaptation of robot control model 112 may be a training of the neural network. For example, the neural network may be trained using a gradient method (a policy gradient method, for example). According to various specific embodiments, one or multiple gradients may be ascertained using projected policy π̃ and initial policy $$\pi_{\theta_{old}}.$$

The adaptation of the neural network using projected policy π̃ may be an iteration of the training of the neural network. According to various specific embodiments, multiple iterations may be carried out. For example, the method described herein for adapting robot control model 112 may be carried out multiple times.

For example, the neural network of robot control model 112 may be adapted (trained, for example) with the aid of the gradient method, using the ascertained one or multiple gradients.

The first projection method and the second projection method may be solved in closed form. The one or multiple gradients may be ascertained directly. For the third projection method, the one or multiple gradients may be ascertained using the OptNet method described by Amos and Kolter. A layer of the neural network may have the following Lagrange duality:

$$\min_{\eta,\omega} g(\eta, \omega)$$

$$\left[ N = \eta\epsilon - \omega\beta + \eta\left(-\frac{1}{2}q_{old}^T \Lambda_{old}^{-1} q_{old} + \frac{1}{2}\log \det(\Lambda_{old}) - \frac{k}{2}\log(2\pi)\right) + \right.$$

$$\left. (\eta + 1 + \omega)\left(\frac{1}{2}q^T \Lambda^{-1} q - \frac{1}{2}\log \det(\Lambda) + \frac{k}{2}\log(2\pi)\right) \right]$$

$$\text{s.t.} \quad -\eta \le 0,$$
$$-\omega \le 0$$

According to various specific embodiments, the one or multiple gradients may be ascertained (computed, for example) by deriving the appropriate Karush-Kuhn-Tucker (KKT) conditions.

The stationary KKT condition may be described with the aid of equation (25), for example:

$$\nabla g(\eta^*, \omega^*) + \begin{pmatrix} \lambda_1 \\ \lambda_2 \end{pmatrix} \nabla \begin{pmatrix} -\eta^* \\ -\omega^* \end{pmatrix} = \begin{pmatrix} \epsilon - KL(q(x)\|q_{old}(x)) - \lambda_1 \\ H(q(x)) - \beta - \lambda_2 \end{pmatrix} = 0, \tag{25}$$

where $\lambda_1$ is a first KKT multiplier and $\lambda_2$ is a second KKT multiplier.

The complementary slackness of the KKT [multipliers] may be described with the aid of equation (26), for example:

$$\lambda_1(-\eta^*) = 0 \lambda_2(-\omega^*) = 0 \tag{26}.$$

According to various specific embodiments, the one or multiple gradients may be ascertained by deriving the Karush-Kuhn-Tucker (KKT) conditions. According to various specific embodiments, the one or multiple layers of the neural network may be configured in such a way that the projection is carried out if one of the conditions described herein (for example, the condition according to equation (3), for example the condition according to equation (4)) for updated policy $\pi_\theta$ is not met. For example, the one or multiple gradients may be ascertained for the following scenarios:

The condition according to equation (3) and the condition according to equation (4) are met. In this case, the updated policy may be used for the gradient method.

For example, projecting the policy and/or computing the gradients with the aid of the one or multiple layers of the neural network are/is not necessary, The condition according to equation (3) is met and the condition according to equation (4) is not met, The condition according to equation (3) is not met and the condition according to equation (4) is met, The condition according to equation (3) and the condition according to equation (4) are not met.

According to various specific embodiments, if at least one of the conditions is not met, the one or multiple layers of the neural network may project the policy as described herein. According to various specific embodiments, if at least one of the conditions is not met and if the third projection method is used, the one or multiple layers of the neural network may ascertain the one or multiple gradients.

One of the three projection methods may be implemented as one or multiple differentiable layers in a neural network, so that the neural network may be trained end-to-end in such a way that the one or multiple conditions (for example, the condition of the trust region) are ensured (met, for example) for each state of the plurality of states during the training.

According to various specific embodiments, control device 106 may be configured to control robotic device 101, using adapted robot control model 112.

Control device 106 may be configured to ascertain the present state of robotic device 101. Control device 106 may be configured to ascertain, with the aid of adapted robot control model 112, an action to be carried out for the present state, using the projected policy. The action to be carried out may be, for example, the action of the plurality of actions, described by the projected multivariate normal distribution, having the highest probability (for example, the action associated with the expected value of the present state). Control device 106 may be configured to control robotic device 101 corresponding to the action to be carried out, so that robotic device 101 executes and/or carries out the action. According to various specific embodiments, robotic device 101 may carry out one or multiple actions, using adapted robot control model 112.

According to various specific embodiments, control device 106 may update the policy, using the one or multiple carried-out actions. As described herein, an updated policy may be ascertained, and a projected policy may be ascertained using the updated policy. According to various specific embodiments, for example for the inference of robot control model 112 (the neural network, for example), the optimization problem may be solved according to equation (27).

$$\min_{\theta} d(\tilde{\pi}, \pi_\theta) \tag{27}$$

Robot control model 112 may be adapted with the aid of a regression (for example, including one or multiple regression steps), using the one or multiple carried-out actions.

According to various specific embodiments, the projected policy may be ascertained according to the objective function given in equation (28). The projected policy may be ascertained in such a way that a difference between the expected reward (cf. equation (2), for example) and the similarity value according to the similarity metric between the projected policy and the updated policy is increased (maximized, for example). The similarity value according to the similarity metric between the projected policy and the updated policy may be ascertained, for example, via distance $d(\tilde{\pi}(a_t|s_t), \pi_\theta(a_t|s_t))$ between the projected policy and the updated policy. The distance between the projected policy and the updated policy may be ascertained, for example, using the three projection methods described herein.

$$\max_{\theta} \mathbb{E}_{(s_t, a_t) \sim \pi_{\theta_{old}}} \left[ \frac{\tilde{\pi}(a_t \mid s_t, \pi_\theta)}{\pi_{\theta_{old}}(a_t \mid s_t)} A^\pi(a_t, s_t) \right] - d(\tilde{\pi}(a_t \mid s_t), \pi_\theta(a_t \mid s_t)). \tag{28}$$

Figure 4:
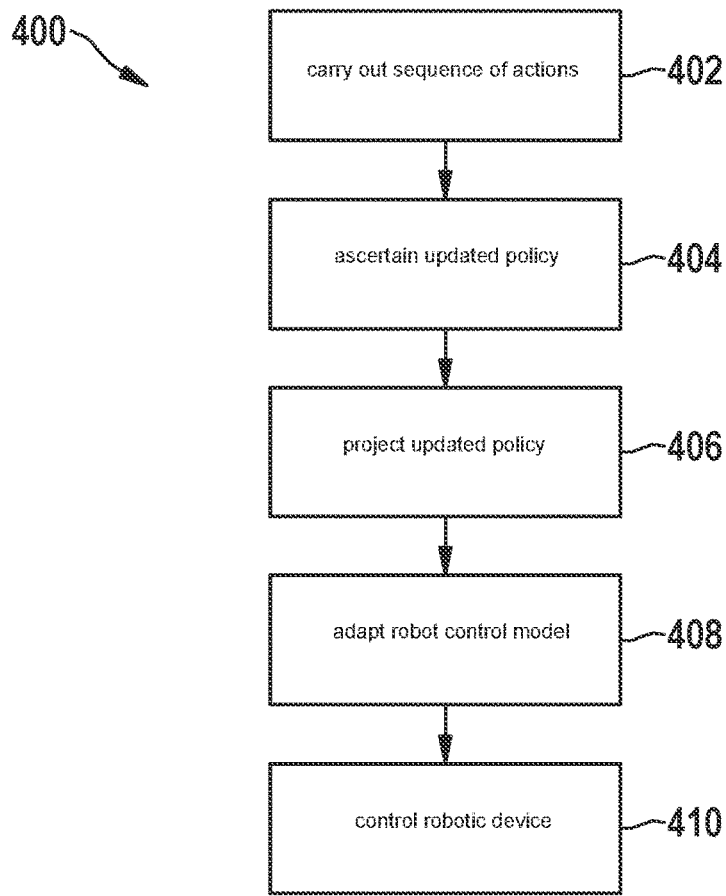
FIG. 4 shows a method for controlling a robotic device according to various specific embodiments of the present invention.

FIG. 4 shows a method 400 for controlling a robotic device according to various specific embodiments.

Method 400 may include carrying out a sequence of actions by the robotic device, using a robot control model (in 402). The carrying out of each action of the sequence of actions may include: ascertaining an action for a present state of a plurality of states of the robotic device with the aid of the robot control model, using an initial policy, carrying out the ascertained action by the robotic device, and ascertaining the state of the robotic device resulting from the carried-out action. According to various specific embodiments, the robot control model may be a reinforcement learning-based model (a reinforcement learning-based neural network, for example).

Method 400 may include an ascertainment of an updated policy, using the carried-out sequence of actions (in 404).

Method 400 may include a projection of the updated policy onto a projected policy (in 406). The projection of the updated policy onto a projected policy may take place in such a way that for each state of the plurality of states of the projected policy, a similarity value according to a similarity metric between the projected policy and the updated policy is increased (maximized, for example), and that for each state of the plurality of states of the projected policy, a similarity value according to the similarity metric between the projected policy and the initial policy is greater than a predefined threshold value. The projection of the updated policy onto a projected policy may take place in such a way that for each state of the plurality of states of the projected policy, a similarity value according to the similarity metric between the projected policy and the updated policy is increased (maximized, for example), that for each state of the plurality of states of the projected policy, a similarity value according to the similarity metric between the projected policy and the initial policy is greater than the predefined threshold value, and that for each state of the plurality of states of the projected policy, an entropy of the projected policy is greater than or equal to a predefined entropy threshold value.

Method 400 may include an adaptation of the robot control model for implementing the projected policy (in 408).

Method 400 may include a control of the robotic device, using the adapted robot control model (in 410).

Figure 5:
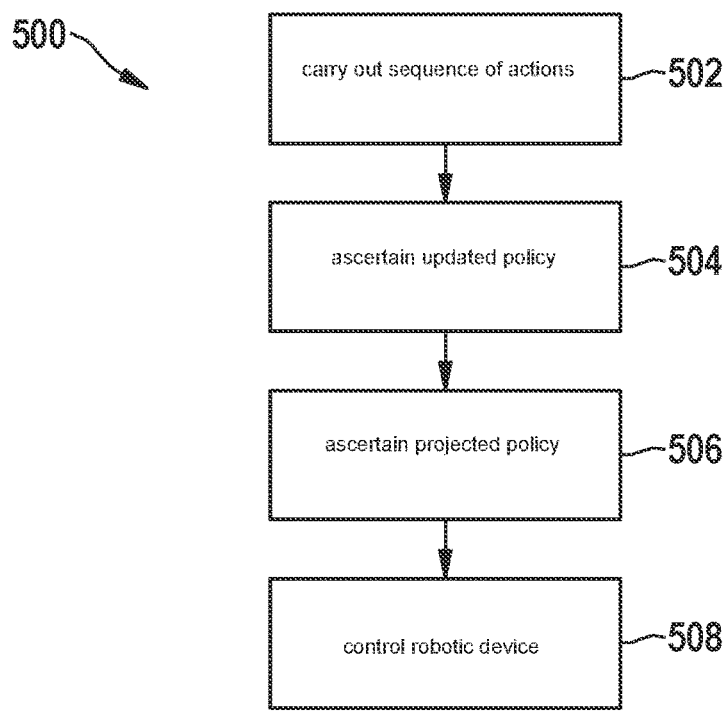
FIG. 5 shows a method for controlling a robotic device according to various specific embodiments of the present invention.

FIG. 5 shows a method 500 for controlling a robotic device according to various specific embodiments.

Method 500 may include carrying out a sequence of actions by the robotic device, using a robot control model (in 502). The carrying out of each action of the sequence of actions may include: ascertaining an action for a present state of a plurality of states of the robotic device with the aid of the robot control model, using an initial policy, carrying out the ascertained action by the robotic device, and ascertaining the state of the robotic device resulting from the carried-out action. According to various specific embodiments, the robot control model may be a reinforcement learning-based model (a reinforcement learning-based neural network, for example).

Method 500 may include an ascertainment of an updated policy, using the carried-out sequence of actions (in 504).

Method 500 may include an ascertainment of a projected policy, so that a difference between a reward expected for the projected policy and a similarity value according to the similarity metric between each state of the plurality of states of the projected policy and the updated policy is increased (maximized, for example) (in 506).

Method 500 may include a control of the robotic device with the aid of the robot control model, using the projected policy (in 508).

According to various specific embodiments, method 500 may include an adaptation of the robot control model for implementing the projected policy, and a control of the robotic device, using the adapted robot control model.

What is claimed is:

1. A method for controlling a robotic device, comprising:
    carrying out a sequence of actions by the robotic device using a robot control model, the carrying out of each action of the sequence of actions including:
        ascertaining an action for a present state of a plurality of states of the robotic device with the aid of the robot control model, using an initial policy,
        carrying out the ascertained action by the robotic device, and
        ascertaining the state of the robotic device resulting from the carried-out action;
    ascertaining an updated policy using the carried-out sequence of actions;
    projecting the updated policy onto a projected policy in such a way that for each state of a plurality of states of the projected policy:
        a similarity value according to a similarity metric between the projected policy and the updated policy is maximized, and
        the similarity value according to the similarity metric between the projected policy and the initial policy is greater than a predefined threshold value;
    adapting the robot control model for implementing the projected policy; and
    controlling the robotic device, using the adapted robot control model, wherein the projected policy is ascertained by a numerical optimizer that ascertains a first optimized Lagrange multiplier and a second optimized Lagrange multiplier for a canonical parameter and a cumulant-generating function of a multivariate normal distribution.

2. The method as recited in claim 1, wherein the projection of the updated policy onto the projected policy includes:
    projecting the updated policy onto the projected policy in such a way that for each state of the plurality of states of the projected policy:
        the similarity value according to the similarity metric between the projected policy and the updated policy is maximized,
        the similarity value according to the similarity metric between the projected policy and the initial policy is greater than the predefined threshold value, and
        an entropy of the projected policy is greater than or equal to a predefined entropy threshold value.

3. The method as recited in claim 1, wherein:
    the initial policy includes an initial multivariate normal distribution of the plurality of actions;
    the updated policy includes an updated multivariate normal distribution of the plurality of actions;
    the projected policy includes a projected multivariate normal distribution of the plurality of actions;
    the projection of the updated policy onto the projected policy includes:
        projecting the updated policy onto the projected policy in such a way that for each state of the plurality of states of the projected policy:
            a similarity value according to the similarity metric between the projected multivariate normal distribution and the updated multivariate normal distribution is maximized, and
            the similarity value according to the similarity metric between the projected multivariate normal distribution and the initial multivariate normal distribution is greater than the predefined threshold value.

4. The method as recited in claim 3, wherein the projection of the updated policy onto the projected policy includes:
    projecting the updated policy onto the projected policy in such a way that for each state of the plurality of states of the projected policy:
        the similarity value according to the similarity metric between the projected multivariate normal distribution and the updated multivariate normal distribution is maximized, and
        the similarity value according to the similarity metric between the projected multivariate normal distribution and the initial multivariate normal distribution is greater than the predefined threshold value; and
        an entropy of the projected multivariate normal distribution is greater than or equal to a predefined entropy threshold value.

5. The method as recited in claim 3, wherein the projection of the updated policy onto the projected policy in such a way that for each state of the plurality of states of the projected policy, the similarity value according to the similarity metric between the projected multivariate normal distribution and the updated multivariate normal distribution is maximized, and the similarity value according to the similarity metric between the projected multivariate normal distribution and the initial multivariate normal distribution is greater than the predefined threshold value, includes:
    ascertaining the projected multivariate normal distribution using the initial multivariate normal distribution, the updated multivariate normal distribution, and the predefined threshold value with the aid of the Mahalanobis distance and the Frobenius norm.

6. The method as recited in claim 5, wherein the ascertainment of the projected multivariate normal distribution includes a Lagrange multiplier method.

7. The method as recited in claim 3, wherein the projection of the updated policy onto the projected policy in such a way that for each state of the plurality of states of the projected policy, the similarity value according to the similarity metric between the projected multivariate normal distribution and the updated multivariate normal distribution is maximized, and the similarity value according to the similarity metric between the projected multivariate normal distribution and the initial multivariate normal distribution is greater than the predefined threshold value, includes:
    ascertaining the projected multivariate normal distribution using the initial multivariate normal distribution, the updated multivariate normal distribution, and the predefined threshold value using a Wasserstein distance.

8. The method as recited in claim 3, wherein the projection of the updated policy onto the projected policy in such a way that for each state of the plurality of states of the projected policy, the similarity value according to the similarity metric between the projected multivariate normal distribution and the updated multivariate normal distribution is maximized, and the similarity value according to the similarity metric between the projected multivariate normal distribution and the initial multivariate normal distribution is greater than the predefined threshold value, includes:
ascertaining the projected multivariate normal distribution using the initial multivariate normal distribution, the updated multivariate normal distribution, and the predefined threshold value using the numerical optimizer.

9. The method as recited in claim 8, wherein the numerical optimizer ascertains the projected multivariate normal distribution, using a Kullback-Leibler divergence.

10. The method as recited in claim 1, wherein the robot control model is a neural network, and the projection of the updated policy onto the projected policy is implemented as one or multiple layers in the neural network.

11. The method as recited in claim 1, wherein the adaptation of the robot control model for implementing the projected policy includes an adaptation of the robot control model using a gradient method.

12. The method as recited in claim 1, wherein the control of the robotic device using the adapted robot control model includes:
carrying out one or multiple actions by the robotic device, using the adapted robot control model; and
updating the policy using a regression, using the carried-out one or multiple actions.

13. The method as recited in claim 1, wherein the control of the robotic device using the adapted robot control model includes:
carrying out one or multiple actions by the robotic device, using the adapted robot control model;
updating the policy, using the carried-out one or multiple actions, in such a way that a difference between an expected reward and a similarity value according to the similarity metric between the projected policy and the updated policy is maximized.

14. A device configured to control a robotic device, the device configured to:
carry out a sequence of actions by the robotic device using a robot control model, the carrying out of each action of the sequence of actions including:
ascertaining an action for a present state of a plurality of states of the robotic device with the aid of the robot control model, using an initial policy,
carrying out the ascertained action by the robotic device, and
ascertaining the state of the robotic device resulting from the carried-out action;
ascertain an updated policy using the carried-out sequence of actions;
project the updated policy onto a projected policy in such a way that for each state of a plurality of states of the projected policy:
a similarity value according to a similarity metric between the projected policy and the updated policy is maximized, and
the similarity value according to the similarity metric between the projected policy and the initial policy is greater than a predefined threshold value;
adapt the robot control model for implementing the projected policy; and
control the robotic device, using the adapted robot control model, wherein the projected policy is ascertained by a numerical optimizer that ascertains a first optimized Lagrange multiplier and a second optimized Lagrange multiplier for a canonical parameter and a cumulant-generating function of a multivariate normal distribution.

15. A non-transitory nonvolatile memory medium that stores program instructions for controlling a robotic device, the program instructions, when executed by a computer, causing the computer to perform the following steps:
carrying out a sequence of actions by the robotic device using a robot control model, the carrying out of each action of the sequence of actions including:
ascertaining an action for a present state of a plurality of states of the robotic device with the aid of the robot control model, using an initial policy,
carrying out the ascertained action by the robotic device, and
ascertaining the state of the robotic device resulting from the carried-out action;
ascertaining an updated policy using the carried-out sequence of actions;
projecting the updated policy onto a projected policy in such a way that for each state of a plurality of states of the projected policy:
a similarity value according to a similarity metric between the projected policy and the updated policy is maximized, and
the similarity value according to the similarity metric between the projected policy and the initial policy is greater than a predefined threshold value;
adapting the robot control model for implementing the projected policy; and
controlling the robotic device, using the adapted robot control model, wherein the projected policy is ascertained by a numerical optimizer that ascertains a first optimized Lagrange multiplier and a second optimized Lagrange multiplier for a canonical parameter and a cumulant-generating function of a multivariate normal distribution.

* * * * *